United States Patent [19]
Sekiguchi et al.

[11] Patent Number: 5,410,226
[45] Date of Patent: Apr. 25, 1995

[54] POWER WINDOW APPARATUS AND METHOD FOR CONTROLLING THE SAME

[75] Inventors: Satoru Sekiguchi; Takeshi Ito; Masaru Kato, all of Yokohama, Japan

[73] Assignee: Jidosha Denki Kogyo Kabushiki Kaisha, Yokohama, Japan

[21] Appl. No.: 183,372

[22] Filed: Jan. 19, 1994

[30] Foreign Application Priority Data

Jan. 21, 1993 [JP] Japan .................................. 5-008450

[51] Int. Cl.$^6$ ...................... H02P 1/22; E05F 15/08
[52] U.S. Cl. ...................... 318/266; 318/286; 318/434; 318/469
[58] Field of Search ............... 318/256, 264, 265, 266, 318/267, 280, 286, 434, 466, 467, 468, 469; 388/903, 907.5, 912; 49/26, 28; 340/825.57, 825.62, 825.65

[56] References Cited

U.S. PATENT DOCUMENTS

| | | | |
|---|---|---|---|
| 4,468,596 | 8/1984 | Kinzl et al. | 318/287 |
| 4,608,637 | 8/1986 | Okuyama et al. | 318/466 X |
| 4,983,896 | 1/1991 | Sugiyama et al. | 318/286 |
| 5,334,876 | 8/1994 | Washeleski et al. | 318/469 X |

*Primary Examiner*—Bentsu Ro
*Attorney, Agent, or Firm*—Sughrue, Mion, Zinn, Macpeak & Seas

[57] ABSTRACT

A power window apparatus is controlled by comparing present rotational frequency of a motor with a reference value selected depending on a present position of a window glass among plural reference values predetermined at every position of the window glass, supplying an electric current to the motor in the closing direction of a window when the present rotational frequency of the motor is larger than selected reference value, supplying the electric current to the motor in the opening direction of the window when the present rotational frequency is not larger than the selected reference value and the window glass does not arrive in a full-closed position, and cutting the current supply to the motor when the present rotational frequency is not larger than the selected reference value and the window glass arrives in the full-closed position.

3 Claims, 7 Drawing Sheets

POWER WINDOW APPARATUS AND METHOD FOR CONTROLLING THE SAME

BACKGROUND OF THE INVENTION

1. Field of the Invention

This invention relates to a power window apparatus used for lowering and raising a window glass of motor vehicles and a method used for controlling the power window apparatus, and more particularly to an apparatus and a method possible to detect squeezing of obstacles such as a hand and fingers very accurately and possible to convert the action of the window glass in the opening direction.

2. Description of the Related Art

Herertofore, there has been used a power window apparatus which is possible to convert the action of the window glass in the opening direction of the window by detecting squeezing of the obstacles between the window glass and a window frame during the closing movement of the window glass as shown in FIG. 7.

In FIG. 7, an armature shaft 101 of a geared motor 100 rotates according to an ON-operation of a switch 111, rotational power of the armature shaft 101 is transmitted to a worm wheel 102 and rotational power of the worm wheel 102 is transmitted to an output shaft 105 through a damper 104. The output shaft 105 is connected with a window glass 107 through a window glass-actuating mechanism 106, and rotational power of the output shaft 105 is converted into vertical movement of the window glass 107 in the opening and closing directions by the window glass-actuating mechanism 106. The armature shaft 101 is provided with a rotation detecting mechanism 108, the rotation of the armature shaft 101 is converted into a pulse signal by the rotation detecting mechanism 108 and input to a controller 109. The controller 109 is so designed as to memorize position data between the full-closed position and the full-opened position of the window glass 107 on basis of the number of rotations of the armature shaft 101.

If the rotation of the armature shaft 101 is restricted before the window glass 107 arrives at the full-closed positon, the controller 109 makes judgement that an obstacle or something is caught between the window glass 107 and a window frame by detecting that the rotational frequency of the armature shaft 101 becomes lower than a predetermined reference value through the current position data of the window glass 107 obtained by the pulse signal from the rotation detecting mechanism 108 does not indicate the arrival to the full-closed position of the window glass 107, and the controller 109 cuts the power supply to the motor 100, then supplies an electric current to the motor 100 in the reverse direction, thereby moving the window glass 107 in the opening direction of the window as much as a predetermined distance.

However, contacting area between the window glass 107 and a wether strip disposed in the window frame supporting the window glass 107 increases as the window glass 107 gets near the full-closed position, therefore frictional resistance between the window glass 107 and the wether strip is not constant during the whole length between the full-closed position and the full-opened position of the window glass 107, but becomes larger according as the window glass 107 approaches the full-closed position.

Accordingly, in the conventional power window apparatus shown in FIG. 7, there is a problem in that the window glass 107 turns back before arrival to the full-closed position and it is not possible to close the window when the reference value of the rotational frequency of the armature shaft 101 is established in a large value, and it is not possible to detect the obstacle caught between the window glass 107 and the window frame in earlier stage so that the return back of the window glass 107 may be delayed in a case of predetermining the reference value in a smaller value.

SUMMARY OF THE INVENTION

This invention is made in view of the above mentioned problem of the prior art, it is an object to provide a power window apparatus and a method for controlling the power window apparatus, which is possible to detect the obstacle such as a hand or fingers caught between the window glass and the window frame very accurately and convert the action of the window glass in the opening direction in earlier stage.

The construction of the power window apparatus according to this invention for attaining the above mentioned object is characterized by comprising an open-switch and a close-switch operable for opening and closing a window of a motor vehicle, a reversible motor of which output shaft is mechanically connected with a window glass for lifting and lowering the window glass betweeen full-closed position and full-opened position by forward and reverse rotation of the output shaft depending on the direction of an electric current supplied thereto, rotation detection means for detecting the rotation of the output shaft of the reversible motor and generating a pulse signal, control means provided with a present value memory and a reference value memory, and drive means for supplying the electric current to the reversible motor in response to output signals from the control means, the present value memory of the control means having a position counter for counting the pulse singal output from the rotation detection means as present position data of the window glass and a pulse period timer for detecting the rotational frequency of the reversible motor according to a present period of the pulse singal output from the rotation detection means, and the reference value memory of the control means having a point reference value memorizing means stored with a closed point reference value corresponding to a closed point near the full-closed position of the window glass and intermediate point reference values corresponding to plural intermediate points except the point near the full-closed position of the window glass, and a reference time memorizing means stored with plural reference pulse periods corresponding to the rotational frequency of the reversible motor predetermined at every section devided by the intermediate points.

The construction of the method for controlling the power window apparatus according to this invention for attaining the above mentioned object is characterized by comprising the steps of detecting a present position of a window glass by counting number of rotations of a motor for actuating the window glass between full-closed position and full-opened position in opening and closing direction of a window, selecting a reference value of the rotational frequency of the motor depending on the present position of the window glass among plural reference values predetermined at every position of the window glass, comparing present rotational frequency of the motor with the selected reference value according to an ON-operation of a close-switch of the power window apparatus, supplying an electric current to the motor in the closing direction of the window when the present rotational frequency of the motor is larger than selected reference value, suppplying the electric current to the motor in the opening direction of the window when the present rotational frequency of the motor is not larger than selected reference value and the window glass does not arrive at the full-closed position, cutting the power supply to the motor when the present rotational frequency of the motor is not larger than selected reference value and the window glass arrives at the full-closed position, comparing present rotational frequency of the motor with the selected reference value according to an ON-operation of an open-switch of the power window apparatus, supplying the electric current to the motor in the opening direction when the present rotational frequency of the motor is larger than selected reference value, and cutting the power supply to the motor when the present rotational frequency of the motor is not larger than selected reference value.

In the power window apparatus and the method for controlling the power window apparatus according to this invention, plural reference values of the rotational frequency of the motor is established at every position of the window glass. The present rotational frequency of the motor is compared with a reference value selected depending on the present position of the window glass among the plural reference values, and determination is done on basis of the result of the comparison whether an electric current should be intercepted or should be supplied to the motor in the opening or closing direction of the window.

Accordingly, it is possible to detect some obstacle caught between the window glass and the window frame very accurately regardless of the position of the window glass and possible to turn back the window glass very speedily because the detection is done by comparing the present rotational frequency of the motor with the most appropriate reference value according to the present position of the window glass.

DESCRIPTION OF THE PREFERRED EMBODIMENT

A power window apparatus and a method for controlling the power window apparatus according to an embodiment of this invention will be described below on basis of FIG. 1 to FIG. 6.

Figure 1:
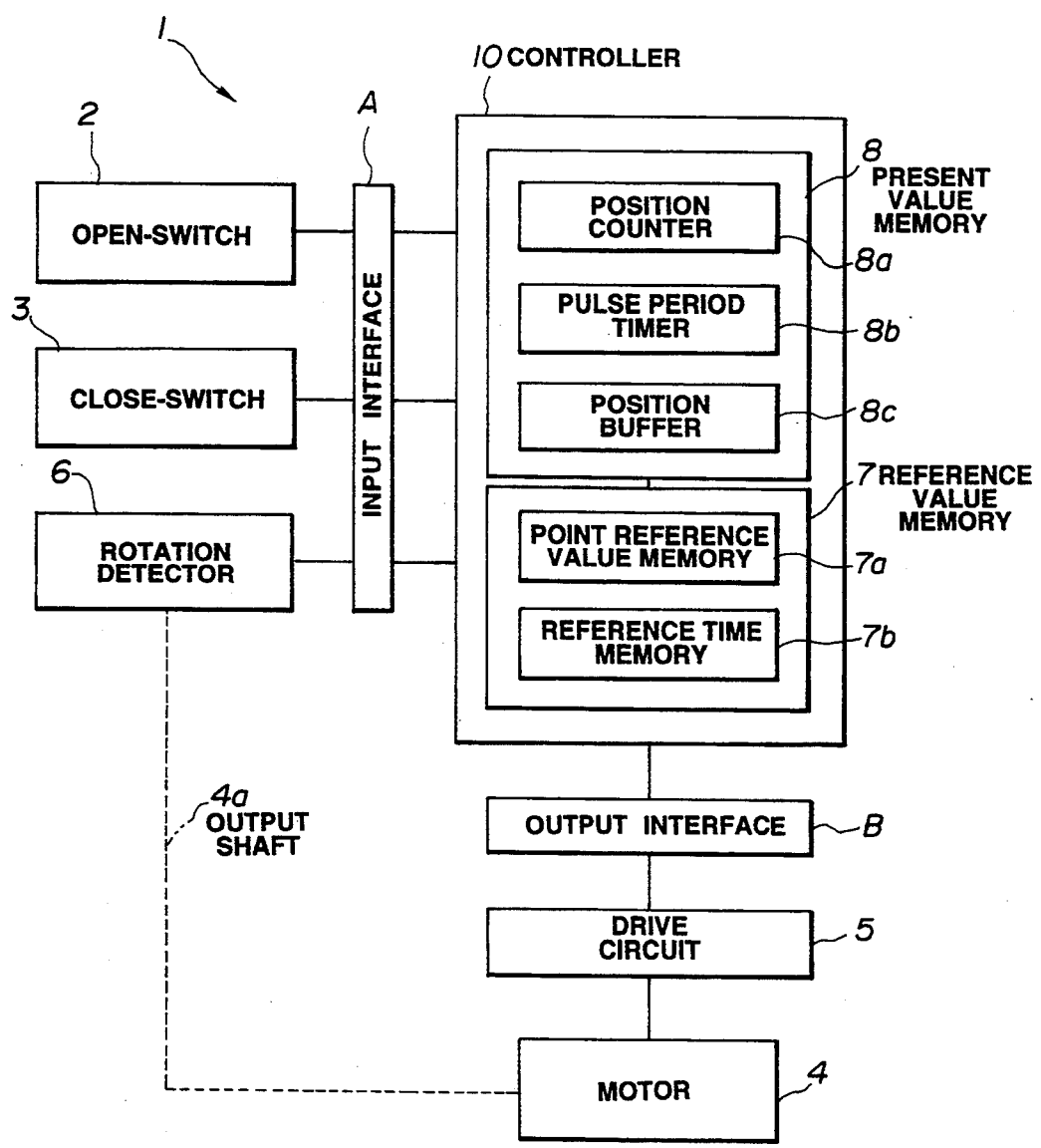
FIG. 1 is a block diagram showing the structure of the power window apparatus according to an embodiment of this invention.
Figure 7:
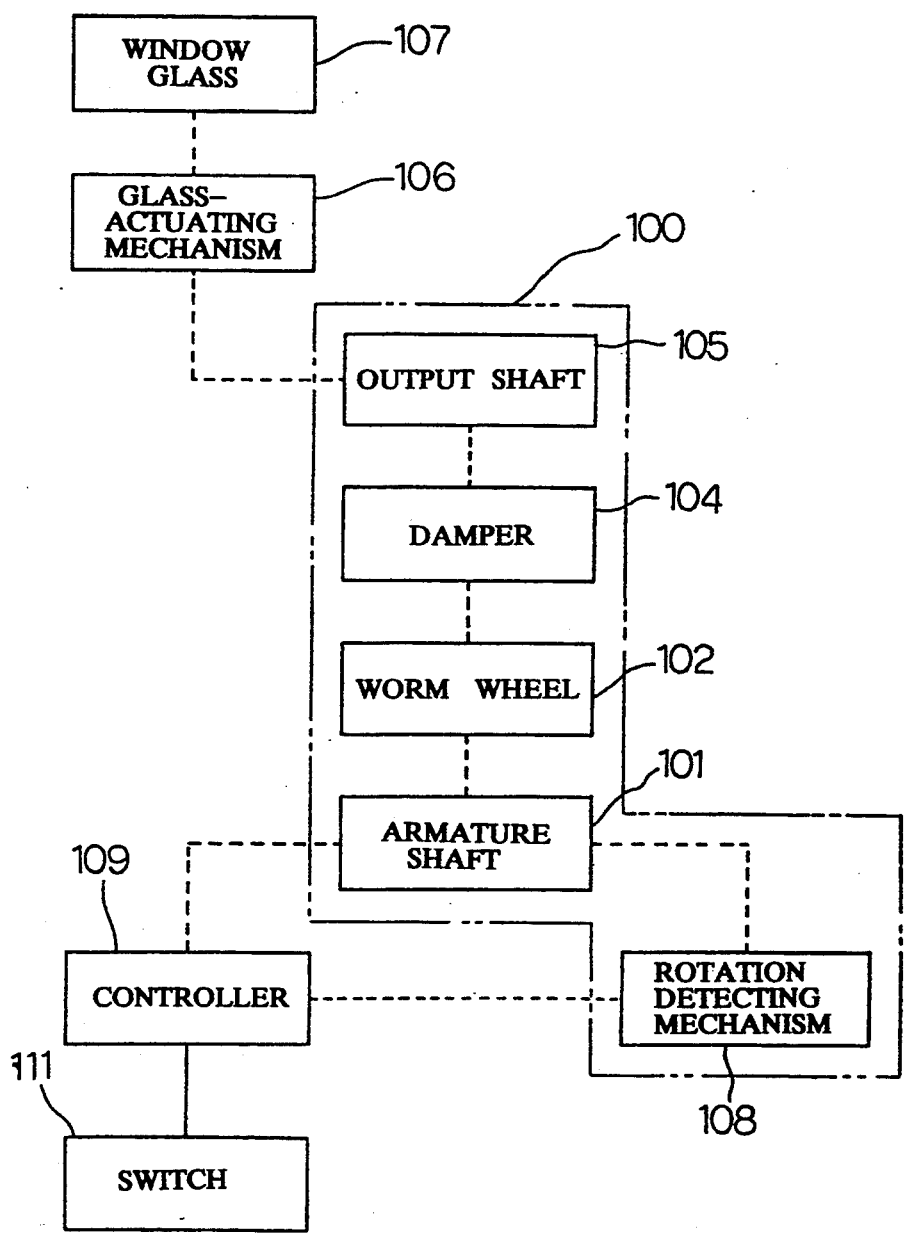
FIG. 7 is a block diagram of the conventional power window apparatus.

A power window apparatus 1, shown in FIG. 1 comprises an open-switch 2 and a close-switch 3, a reversible geared motor 4 having an output shaft 4a mechanically connected with a window glass (see FIG. 7) for lifting and lowering the window glass between the full-closed position and the full-opened position by forward and reverse directional rotation of the output shaft 4a depending on the direction of an electric current supplied to the motor 4, a drive circuit (drive means) 5 for supplying the electric current to the motor 4 according to directions given by a controller 10 which will be described later, a rotation detector (rotation detection means) 6 for generating a pulse signal by detecting the rotation of the output shaft 4a of the motor 4, and a controller (control means) 10 provided with a reference value memory 7 having a point reference value memory 7a stored with a closed point reference value C0 corresponding to a closed point near the full-closed position of the window glass and three intermediate point reference values C1, C2 and C3 corresponding to three points predetermined except the point near the full-closed position in this embodiment and a reference time memory 7b stored with four reference pulse periods T1, T2, T3, and T4 corresponding to the rotational frequency of the motor 4 predetermined respectively at every section devided by the full-closed point and the predetermined three points, and provided with a present value memory 8 having a position counter 8a for obtaining present position data of the window glass by counting the pulse number of the pulse signal output from the rotation detector 6, a pulse period timer 8b for detecting the rotational frequency of the motor 4 according to a present period of the pulse signal output from the rotation detector 6 and a position buffer 8c for provisionally storing the pulse number of the pulse signal from the rotation detector 6.

The open-switch 2 and the close-switch 3 is connected to the controller 10 through an input interface A, and an ON-signal from the open-switch 2 or the close-switch 3 is inputted to the controller 10.

Figure 2:
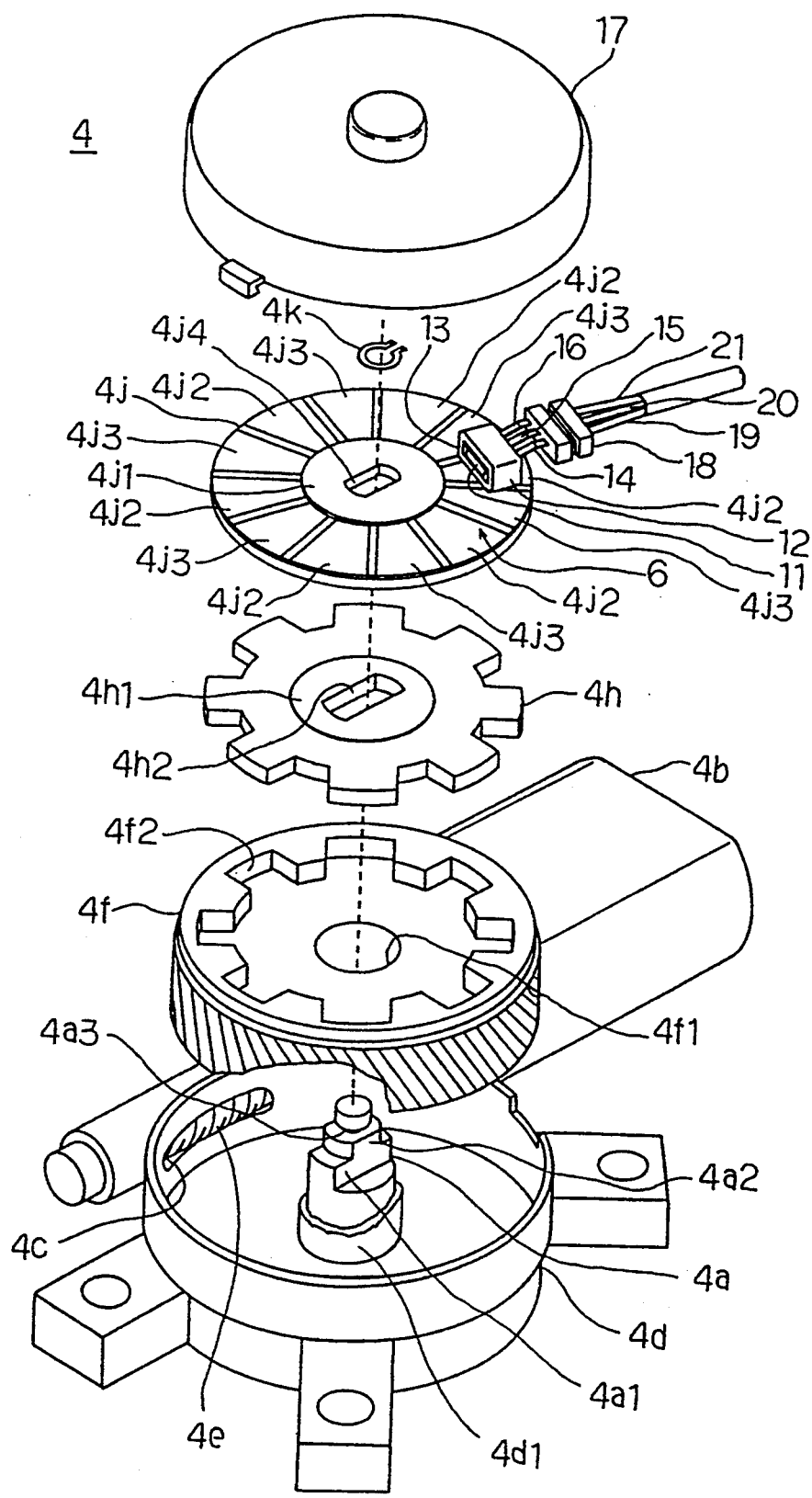
FIG. 2 is an exploded perspective view illustrating the structure of the reversible motor of the power window apparatus shown in FIG. 1.

The motor 4 is a reversible geared motor, and so structured that an end of an armature shaft 4c housed in a motor case 4b extrudes on the side of a gear case 4d and a worm 4e is formed on the extruding portion of the armature shaft 4c into the gear case 4d as shown in FIG. 2. The armatrue (not shown) provided with the armature shaft 4c rotates in the forward or reverse direction according to power supply from the drive circuit 5.

The worm 4e is meshed with a worm wheel 4f in the gear case 4d. The worm wheel 4f is supported rotatably by an output shaft support 4d1 of the gear case 4d piercing a center hole 4f1 thereof, and a damper 4h having radial projections is fitted in a damper recess 4f2 formed on the upper face of the worm wheel 4f. The damper 4h is formed with an oval hole 4h2 in a damper hub 4h1 disposed at the center part thereof. The damper 4h is attached on the output shaft 4a of the motor 4 so as not to be rotatable by fitting the oval hole 4h2 on the output shaft 4a.

On the upper side of the worm wheel 4f, a magnetic plate 4j is disposed. The magnetic plate 4j is shaped in a disc-like form having outside diameter slightly smaller than that of the worm wheel 4f, and disposed with six pairs of a south pole part 4j2 polarized with a south pole and a north pole part 4j3 polarized with a north pole alternatively on the outer periphery of a base 4j1 forming the center part thereof. The magnetic plate 4j is also formed with an oval hole 4j4 in the center part of the base 4j1 similarly to the damper 4h, and disposed not rotatably on the output shaft 4a by fitting the oval hole 4j4 on the output shaft 4a. The south pole part 4j2 and the north pole part 4j3 are of the same angle on the circumference of the magnetic plate 4j.

On the one hand, the output shaft 4a is disposed rotatably in the output shaft support 4d1, provided in the center part of the gear case 4d, and connected to a window glass-actuating mechanism (not shown) on the outside of the gear case 4d at one end thereof, the other end of the output shaft 4a protrudes on the inside of the gear case 4d. The output shaft 4a is provided with a damper-fixing part 4a1 having a section to be fitted in the oval hole 4h2 of the damper 4h on the protruding portion in the gear case 4d, and provided with a magnetic plate-fixing part 4a2 having a section to be fitted in the oval hole 4j4 of the magnetic plate 4j on the upper side of the damper-fixing part 4a1. The damper 4h and the magnetic plate 4j are fixed to the output shaft 4a by inserting a C-shaped ring 4k into a groove 4a3 formed on the upper side of the magnetic plate-fixing part 4a2 of the output shaft 4a after fitting the oval holes 4h2 and 4j4 of the damper 4h and the magnetic plate 4j onto the damper-fixing part 4a1 and the magnetic plate-fixing part 4a2 of the output shaft 4a, respectively.

Figure 3:
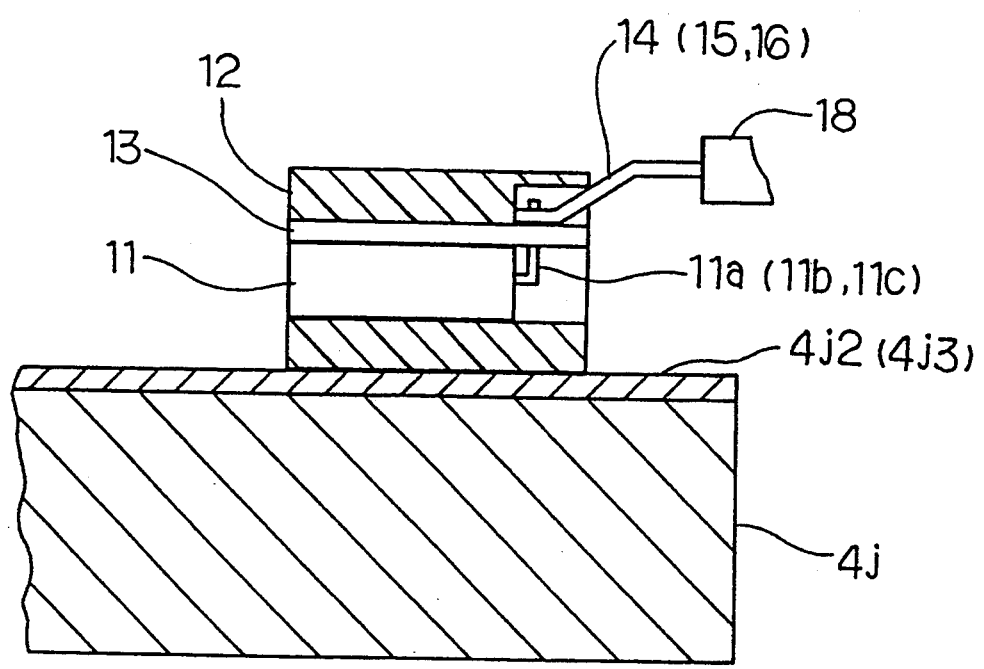
FIG. 3 is a sectional view of the rotation detector disposed in the reversible motor shown in FIG. 2.

On the other hand, Hall elements 11 are disposed in three points on the magnetic plate 4j. The Hall elements 11 are secured under a circuit base 13 in a packed state by a ring-shaped slider member 12 formed with PTFE (polytetrafluoroethylene) resin as shown in FIG. 3, and lead wires 11a, 11b and 11c of the Hall elements 11 are electrically connected to ends of resilient connectors 14, 15 and 16 on the upper side of the circuit base 13. The Hall elements 11 are housed in the gear case 4d and covered with a gear case cover 17. The other ends of the resilient connectors 14, 15 and 16 are fixed to a grommet 18 and connected with external lead wires 19, 20 and 21, respectively. The external lead wires 19, 20 and 21 are connected to the controller 10 shown in FIG. 1. The resilient connectors 14, 15 and 16 have moderate elasticity and energizing the Hall elements 11 toward the south pole part 4j2 and the north pole part 4j3 within the magnetic field of the magnetic plate 4j in a state of contacting the slider member 12 with the magnetic plate 4j. The Hall elements 11 are out of contact with the magnetic plate 4j directly since the slider member 12 is in contact with the magnetic plate 4j.

The Hall elements 11 are energized toward the south pole part 4j2 and the north pole part 4j3 of the magnetic plate 4j and induces Hall voltage by the rotating magnetic field caused by the rotation of the magnetic plate 4j. Hall voltage shows a low level and a high level alternatively every time one pair of the south pole part 4j2 and the north pole part 4j3 pass the Hall elements 11 by the rotation of the magnetic plate 4j. The rotation detector 6 is formed by the Hall elements and the magnetic plate 4j and makes the controller recognize the present position of the window glass and the rotational frequency of the motor 4 by inputting the rotationing condition of the magnetic plate 4j as a pulse singal into the position counter 8a and the pulse period timer 8b of the controller 10 through the external lead wires 19, 20 and 21 and the interface circuit A.

The drive circuit 5 is a switching mechanism such as a relay and connected to the controller 10 through an output interface circuit B, and so structured as to supply the electric current to the motor 4 in order to rotate the motor 4 in the forward or reverse direction according to the output signal from the controller 10.

The controller 10 is provided with a microcomputer having the reference value memory 7 and the present value memory 8. The reference value memory 7 is a ROM (read-only memory), the point reference value memory 7a provided in this reference value memory 7 is stored previously with the closed point reference value C0 corresponding to a closed point near the full-closed position of the window glass within a memory area corresponding to a stroke between the full-closed position and the full-opened position of the window glass, and three intermediate point reference values C1, C2 and C3 corresponding to three points predetermined within the memory area except the closed point reference value C0. Additionally, although the three intermediate point reference values C1, C2 and C3 are established in this embodiment, the number of the intermediate point reference value is not limited to this embodiment and the intermediate point reference value may be established more than three.

The closed point reference value C0 and the intermediate point reference values C1, C2 and C3 are compared with the present position date output from the position counter 8a described later. The first intermediate point reference value C1 corresponds to the point shifting a little toward the full-opened position of the window glass from the closed point corresponding to the closed point reference value C0, the second intermediate point reference value C2 corresponds to the point further shifting toward the full-opened position of the window glass from the closed point, and the third intermediate point reference value C3 corresponds to the point lying halfway between the full-closed position and the full-opened position of the window glass. Accordingly, the closed point reference value and the intermediate point reference values have following relationship; $C0 < C1 < C2 < C3$. The closed point near the full-closed position of the window glass corresponds to a point where an opening is obtained between the window glass and the window frame, which is smaller than a gap induced by fingers caught between the window glass and the window frame at the time of closing the window.

The reference time memory 7b provided in the reference value memory 7 is stored with pulse periods of the pulse signal generated by the rotation of the motor 4 as four reference pulse periods T1, T2, T3 and T4. One of the reference pulse periods T1, T2, T3 and T4 is selected according to the present position of the window glass detected by comparing the present position data output from the position counter 8a with the intermediate point reference values C1, C2 and C3, stored in the point reference value memory 7a, and the selected reference pulse periods T1, T2, T3 or T4 is compared with the present period of the pulse signal output from the pulse period timer 8b when the close-switch 3 is switched on. The values of the reference pulse periods have following relationship; $T1 > T2 > T3 > T4$, because the frictional resistance between the window glass and the wether strip becomes larger according as the window glass moves to the full-closed position from the full-opend position as mentioned above.

The present value memory 8 is a RAM (ramdom access memory), the position counter 8a provided in this present value memory 8 is so designed as to obtain the present position data of the window glass by storing the pulse number of the pulse signal output from the rotation detector 6 in the RAM area. The controller 10 judges whether the window glass exists in a position near the full-closed position, a position lying a little toward the full-opened position or a position lying halfway betwen the full-closed position and the full-opened position by comparing the present position data stored in the position counter $8a$ with the intermediate point reference values C1, C2 and C3 stored in the point reference value memory $7a$ successively. The first periodic time T1 is set as the reference pulse period when the present position data in the position counter $8a$ does not exceed the first intermediate point reference value C1 in the point reference value memory $7a$, the second periodic time T2 is set as the reference pulse period when the present position data in the position counter $8a$ exceeds the first intermediate point reference value C1 and does not exceed the second intermediate point reference value C2 in the point reference value memory $7a$, the third periodic time T3 is set as the reference pulse period when the present position data in the position counter $8a$ exceeds the second reference value C2 and does not exceed the third intermediate point reference value C3 in the point reference value memory $7a$, and the fourth periodic time T4 is set as the reference pulse period in a case the present position data in the position counter $8a$ exceeds the third intermediate point reference value C3 in the point reference value memory $7a$.

The present value memory 8 is provided with the pulse period timer $8b$, the pulse period timer $8b$ is stored with the present period of the pulse signal output from the rotation detector 6. The controller 10 judges that the motor 4 is applied with over load or not by detecting whether the rotational frequency of the motor 4 decreases or not at every position of the window glass according to the comparison of the present period stored in the pulse period timer $8b$ with the selected periodic time T1, T2, T3 or T4 in the reference time memory $7b$. The present value memory 8 is also provided with the position buffer $8c$, which has a function for storing the pulse number of the pulse signal output from the rotation detector 6 provisionally as described above.

The controller 10 starts to work at the same time the open-switch 2 or the close-switch 3 is switched on, when the open-switch 2 is switched on, the controller 10 supplies the electric current in the opening direction of the window to the motor 4 through the drive circuit 5 if the present period of the pulse period timer $8b$ is compared with the periodic time T1, T2, T3 or T4 in the reference time memory $7b$ set as the reference pulse period and the present period of the pulse singal is shorter than the respective reference pulse peiord T1, T2, T3 or T4 at every position of the window glass, and the controller 10 cuts the power supply to the motor 4 when the present period of the pulse period timer $8b$ is not shorter than the respective reference pulse period T1, T2, T3 or T4.

Recognizing ON-operation of the close-switch 3, the controller 10 supplies the electric current to the motor 4 through the drive circuit S in the closing direction of the window if the present period of the pulse period timer $8b$ is shorter than the respective reference pulse period T1, T2, T3 or T4 at every position of the window glass, and supplies the electric current to the motor 4 in the reverse direction through the drive circuit 4 in order to open the window when the present period of the pulse period timer $8b$ is not shorter than the respective reference pulse period T1, T2, T3 or T4 at every position of the window glass and present position data of the window glass in the position counter $8a$ is larger than the closed point reference value C0, furthermore cuts the power supply to the motor 4 through the drive circuit 5 and resets the position counter $8a$ in a case the present period of the pulse period timer $8b$ is not shorter than the first reference pulse period T1 and present position data in the position counter $8a$ is not larger than the closed point reference value C0.

Figure 4:
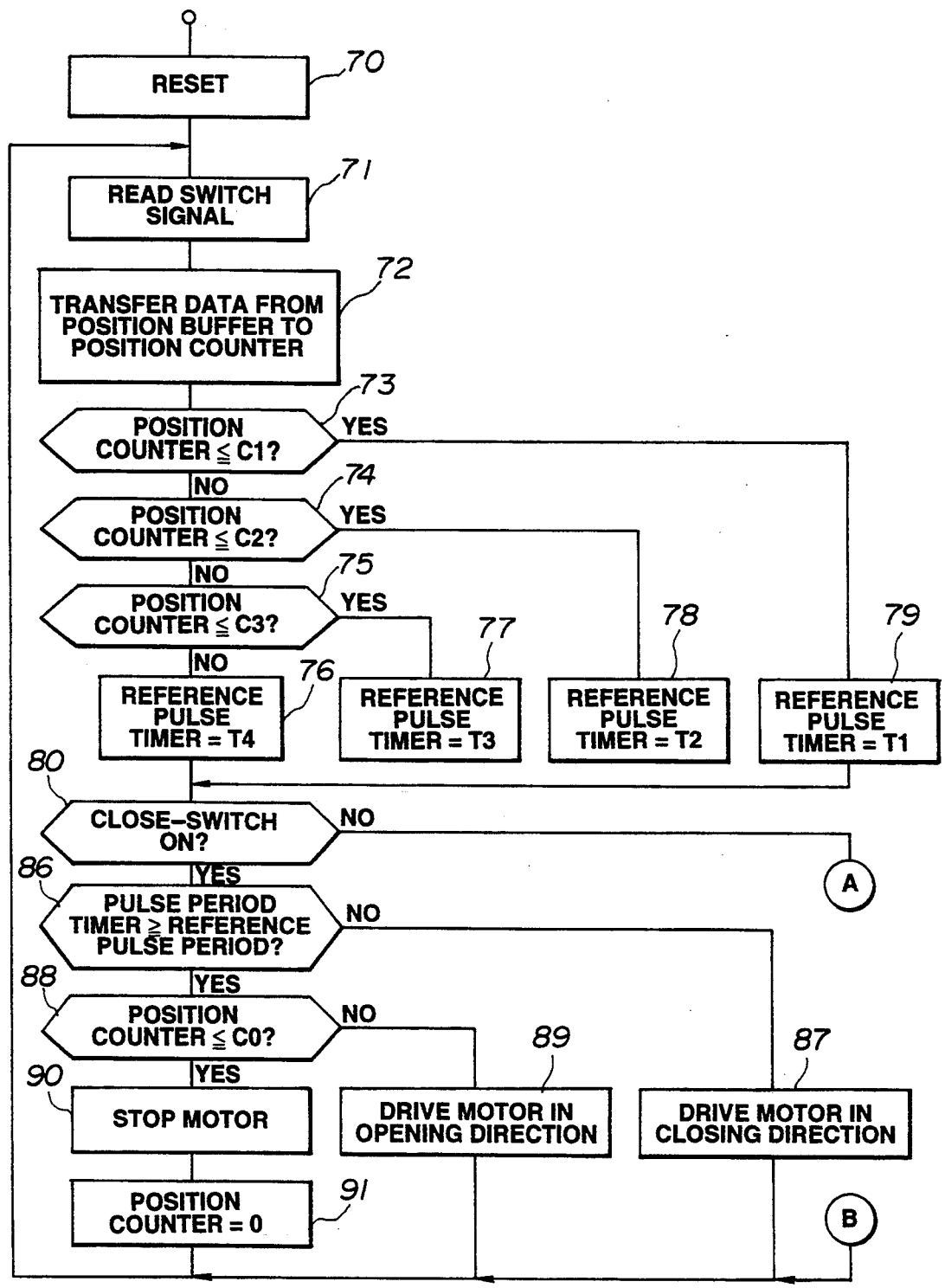
FIGS. 4, 5 and 6 are flow-charts illustrating the control program executed in the method for controlling the power window apparatus according to this invention.
Figure 5:
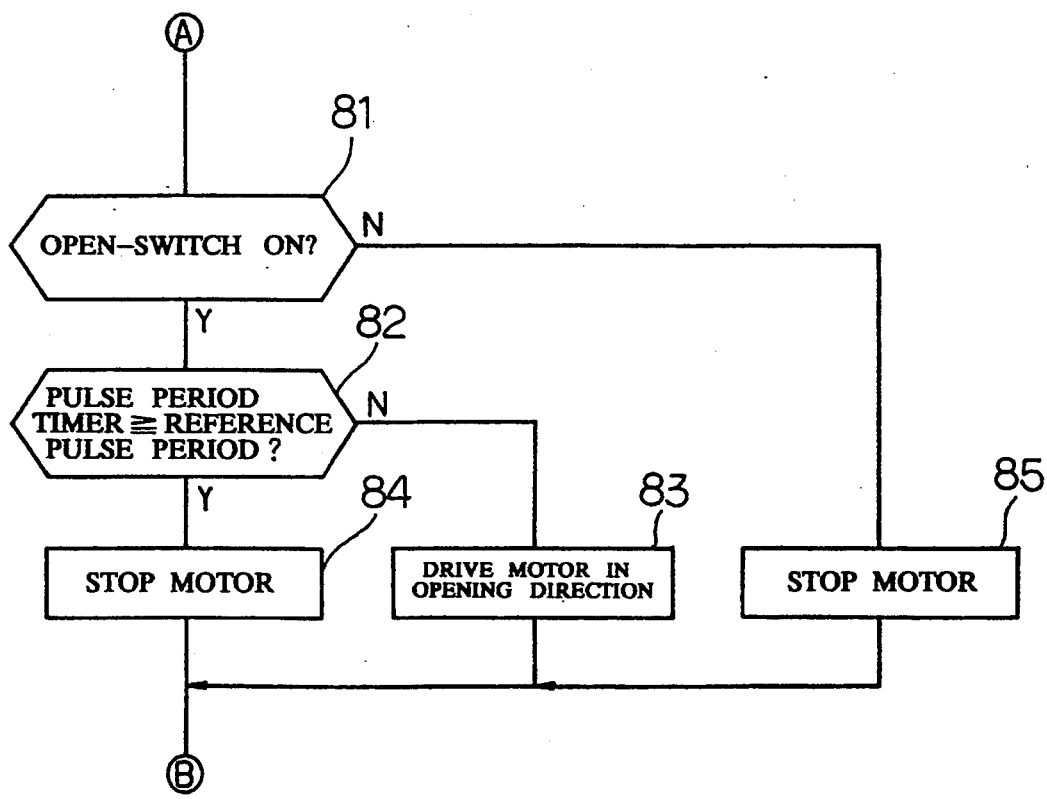
Figure 6:
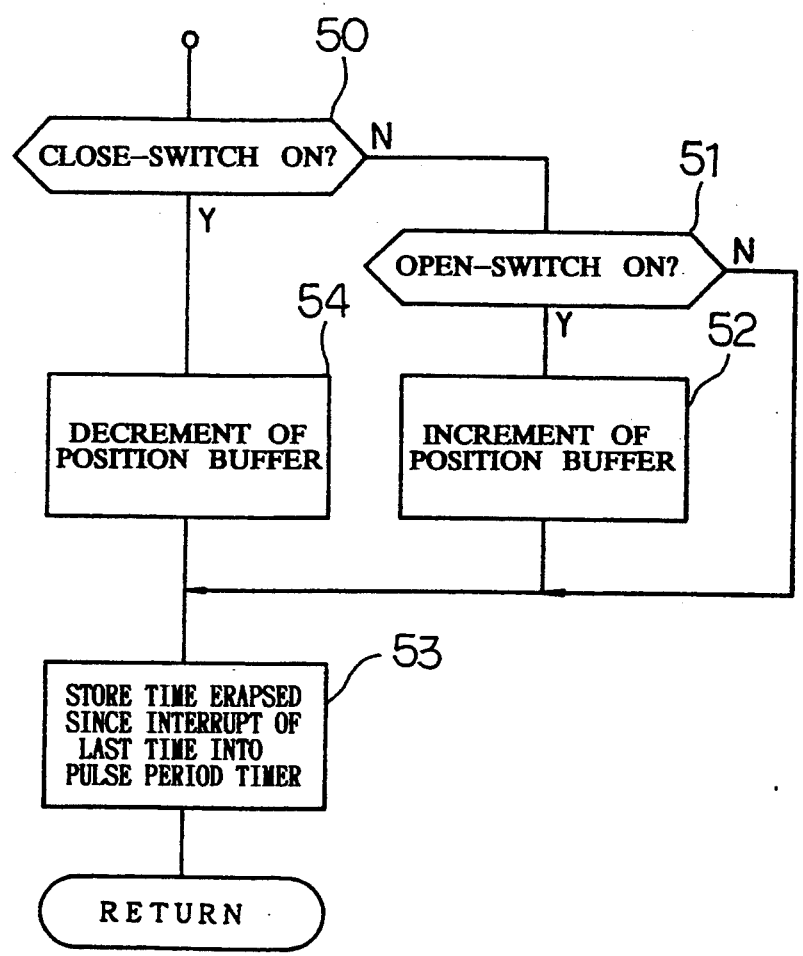

In the power window apparatus having the above-mentioned structure, a control program shown in FIGS. 4, 5 and 6 starts at the same time the open-switch 2 is switched on when the window glass sits at the full-closed position. In this program, the main routine is formed by steps 70 to 91, and an interrrupt routine is formed by steps 50 to 54, which is executed with priority to the main routine when the pulse singal is inputted to the controller 11 according to the rotation of the motor 4.

The control proceeds to step 71 from step 70 after resetting, and proceeds to step 72 after reading a switch signal at the step 71, at the step 72 data in the position buffer $8c$ are transfered into the position counter $8a$, the control further proceeds to step 73 and comparison is done whether the present position data in the position counter $8a$ is smaller than the first intermediate point reference value C1 or not at the step 73.

In this time, the window glass sits at the full-closed position and value of the position counter $8a$ (present position data of the window glass) is zero, therefore judgement is done to be "YES" at the step 73, the first periodic time T1 (which is the longest time) in the reference time memory $7b$ is set as the reference pulse period at setp 79 and the control proceeds to step 80.

Since the open-switch 2 is switched on, but the close-switch 3 is not operated, judgement is done to be "NO" at the step 80 and to be "YES" at step 81 shown in FIG. 5, and comparison is done between the present period in the pulse period time $8b$ and the reference pulse period T1 at step 82.

At the step 82, judgement is done to be "NO", since the .pulse period timer $8b$ is reset at setp 70, and an electric current is supplied to the motor 4 in the opening direction of the window at step 83, then the control returns to the step 71.

By the current supply to the motor 4 in the opening direction of the window, the armature shaft $4c$ of the motor 4 rotates, and the worm wheel $4f$ meshed with the worm $4e$ of the armature shaft $4c$ begins to rotate together with the damper $4h$. Whereby, the rotational power of the worm wheel $4f$ is transmitted to the output shaft $4a$ through the damper $4h$ and the output shaft $4a$ rotates. Accordingly, the window glass connected to the output shaft $4a$ on the outside of the gear case $4d$ shifts in the opening direction of the window by the rotation of the output shaft $4a$.

The magnetic plate $4j$ secured to the output shaft $4a$ rotates together with the output shaft $4a$, thereby generating the rotating magnetic field, and the Hall elements 11 produces Hall voltage by the rotating magnetic field and outputs the pulse signal into the controller 10.

The interrupt routine shown in FIG. 6 are executed according to the input of the pulse signal into the controller 10 from the rotation detector 6. The control proceeds to step 52 after judging to be "NO" and "YES" at steps 50 and 51, respectively. At the step 52, the position buffer $8c$ is incremented, and the time elapsed since the interrupt of the last time is stored into the pulse period timer $8b$, the control returns to the main routine.

The control returns to the main routine and proceeds to the step 73 after exececuting the steps 71 and 72 in the same manner as described above, and the comparison is done between the value of the position counter 8a and the first intermediate point reference value C1 at the step 73.

As the value of the position counter 8a becomes larger according as the window glass moves in the opening direction (downwardly) of the window, judgement is done to be "NO" at the step 73 if the window glass is in the position lying a little toward the full-opened position from the full-closed position, judgement is done at step 74 to be "YES" and the second periodic time T2 in the reference time memory 7b is set as the reference pulse period at step 78.

Subsequently, the control proceeds to the step 82, the comparison is done between the present period in the pulse period timer 8b and the reference pulse period T2 at the step 82. When any abnormality is not recognized, judgement is done to be "NO" at the step 82 and the electric current is supplied continuously to the motor 4 in the opening direction of the window, then the control returns to the step 71.

In this time, if some obstacle such as a finger is caught between the window glass and the whether strip disposed in the window frame, judgement is done to be "YES" at the step 82 because the rotational frequency of the motor 4 decreases owing to the excessive load applied on the motor 4 and the present period of the pulse signal in the pulse period timer 8b becomes longer than the reference pulse period T2, and the current supply to the motor 4 is cut off at step 84. Whereby, the motor 4 stops at the current position, and the control returns to the step 71.

Additionally, when the open-switch 2 is switched off during the movement of the window glass, judgement is done at step 81 to be "NO" and the current supply to the motor 4 is cut off at step 85, thereby stopping the motor 4 at the current position, and control returns to the step 71.

When the window glass further moves normally in the opening direction of the window, judgement is done at steps 73 and 74 to be "NO" and further done at step 75 to be "YES", so that the third periodic time T3 in the reference time memory 7b is set as the reference pulse period at step 77. Furthermore, when the window glass further moves toward the opening direction and arrives in the posiiton lying halfway between the full-closed position and the full-opened position, judgement is done at steps 73, 74 and 75 to be "NO", so that the fourth periodic time T4 in the reference time memory 7b is set as the reference pulse period at step 76, and the comparison at the step 82 is executed against the periodic time T3 and T4 successively.

In such a manner, the reference pulse period changes one by one in company with the movement of the window glass, and it is possible to detect some obstacle caught between the window glass and the window frame very accurately because the detection is executed by comparing the present period with the most appropriate reference pulse period predetermined at every position of the window glass.

When the window glass arrives in the full-opened position, the movement of the window glass is restricted at the full-opened position and the rotational frequency of the motor 4 decreases drastically owing to the excessive load applied on the motor 4, so that the present period of the pulse signal in the pulse period timer 8b becomes longer than reference pulse period T4, and judgement is done to be "YES" at the step 82. Accordingly, the current supply to the motor 4 is intercepted at step 84, thereby stopping the motor 4, and the window glass stops at the full-opened position.

At the time of switching on the close-switch 3 when the window glass sits at the full-opened position, the control proceeds to the step 71 after resetting at the step 70 and the data in the position buffer 8c are transfered into the position counter 8a similarly to the case of the ON-operation of the open-switch 2.

Next, the comparison of the value of the position counter 8a with the intermediate point reference values C1, C2 and C3 at the steps 73, 74 and 75, respectively.

In this time, the window glass sits at the full-opened position and the value of the position counter 8a shows the maximum value, so that judgement is done to be "NO" at the steps 73, 74 and 75, and the fourth periodic time T4 in the reference time memory 7b is set as the reference pulse period at the step 76. The close-switch 3 is judged to be switched on (YES) at the step 80, and judgement is done whether the present period in the pulse period timer 8b is longer than the reference pulse period T4 set at the step 76 or not at step 86.

At the step 86, judgement is done to be "NO" since the pulse period timer 8b is reset at step 70, and the electric current is supplied to the motor in the closing direction of the window at step 87, then the control returns to the step 71. The motor is supplied continuously with the electric current in the closing direction of the window and the window glass moves in the closing direction of the window (upwardly), because the present period in the pulse period timer 8b is never exceeds the reference pulse period T4 at the step 86 so long as the excessive load is not applied on the motor 4.

In this time, if some obstacle such as a finger, a hand or the like is caught between the window glass and the window frame, judgement is done to be "YES" at the step 86 because the rotation frequency of the motor 4 decreases owing to the excessive load applied on the motor 4 and the present period in the pulse period timer 8b becomes longer than the reference pulse period T4, and the control proceeds to step 88. In the step 88, judgement is done whether the window glass arrives at the full-closed position or not by comparing the value of the position counter 8a with the closed point reference value C0 in the point reference value memory 7a.

At the step 88, judgement is done to be "NO" since the window glass is in the position near the full-opened position and the value of the position counter 8a is larger than the closed point reference value C0. Namely, the controller judges that some obstacle is caught between the window glass and the window frame according to the information that the movement of the window glass is restricted at a position other than full-closed position, and supplies the electric current to the motor 4 in the reverse direction so as to move the window glass in the opening direction of the window at step 89. The control returns to the step 71.

When the close-switch 2 is switched off during the actuation of the window glass, judgement is done to be "NO" at the step 80 and the step 81 shown in FIG. 5, and the current supply to the motor 4 is cut off at step 85, thereby stopping the motor 4 at the current position.

When the window glass moves normally in the closing direction of the window and exceeds the halfway point between the full-opened position and the full-closed position, the value of the position counter 8a is judged to be not larger than the third intermediate point reference value C3 (YES) at the step 85 and the third periodic time T3 longer than T4 in the reference time memory 7b is set as the reference pulse period at the step 77. Then, the comparison is done between the present period of the pulse signal and the reference pulse period T3, and the judgement is done whether the electric current should be supplied to the motor 4 in the closing or opening direction of the window according to the result of this comparison.

When the window glass further moves in the closing direction of the window, the value of the position counter 8a is judged to be not larger than the second and the first intermediate point reference values C2 and C1 sucessively at the steps 74 and 73, so that the second periodic time T2 and the first periodic time T1 are set respectively as the reference pulse periods at the steps 78 and 79 successively.

In this manner, the reference pulse period is re-written to larger value one by one in company with the movement of the window glass from the full-opened position to the full-closed position and the present period of the pulse period timer 8b is compared always with the most appropriate reference pulse priod selected according to the present position of the window glass. Therefore, it is possible to detect the obstacle caught between the window glass and the window frame very accurately and possible to return the window glass in the opening direction very speedily in the case of detecting the squeezing of the obstacle.

When the window glass arrives in the full-closed position, the movement of the window glass is restricted by the window frame and the rotational frequency of the motor 4 decreases owing to the excessive load applied on the motor 4, so that the present period in the pulse period timer 8b bcomes longer than reference pulse period T1 and judgement is done to be "YES" at step 86. Subsequently, judgement is done to be "YES" at the step 88 because the window glass arrives in the full-closed position and the value of the position counter 8a becomes smaller than the closed point reference value C0 in the point reference value memory 7a.

Next, the current supply to the motor 4 is intercepted at step 90, thereby stopping the motor 4, and the window glass also stops at the full-opened position.

The control returns to the step 71 after resetting the position counter 8a at step 91 in order to cancel an aberration of the position counter 8a.

As mentioned above, in the power window apparatus and the method for controlling the power window apparatus according to this invention, the obstacle such as a hand, fingers or so caught between the window glass and the window frame is detected by comparing the rotational frequency of the motor with the most appropriate reference value selected depending on the present position of the window glass, therefore it is possible to detect the caught obstacle very accurately regardless of the position of the window glass and return the window glass in the opening direction of the window in the early stage of the squeezing and an excellent effect can be obtained in that safety of the power window apparatus is improved very availably.

What is claimed is:

1. A power window apparatus comprising:
   an open-switch and a close-switch operable for opening and closing a window of a motor vehicle;
   a reversible motor of which output shaft is mechanically connected with a window glass for lifting and lowering the window glass between full-closed position and full-opened position by forward and reverse rotation of the output shaft depending on the direction of an electric current supplied thereto;
   rotation detection means for detecting the rotation of the output shaft of said reversible motor and generating a pulse signal;
   control means provided with a present value memory and a reference value memory; and
   drive means for supplying the electric current to said reversible motor in response to output signals from said control means;
   said present value memory of the control means having a position counter for counting the pulse signal output from said rotation detection means as present position data of the window glass and a pulse period timer for detecting the rotational frequency of the reversible motor according to a present period of the pulse signal output from said rotation detection means; and
   said reference value memory of the control means having a point reference value memorizing means stored with a closed point reference value corresponding to a closed point near the full-closed position of the window glass and intermediate point reference values corresponding to plural intermediate points except said closed point near the full-closed position of the window glass, and a reference time memorizing means stored with plural reference pulse periods corresponding to the rotational frequency of the reversible motor predetermined at every section devided by said intermediate points.

2. A method for controlling a power window apparatus, comprising the steps of:
   detecting a present position of a window glass by counting number of rotations of a motor for actuating the window glass between full-closed position and full-opened position in opening and closing direction of a window;
   selecting a reference value of the rotational frequency of the motor depending on the present position of the window glass among plural reference values predetermined at every position of the window glass;
   comparing present rotational frequency of the motor with the selected reference value according to an ON-operation of a close-switch of the power window apparatus;
   supplying an electric current to the motor in the closing direction of the window when said present rotational frequency of the motor is larger than the selected reference value;
   supplying the electric current to the motor in the opening directon of the window when said present rotational frequency of the motor is not larger than the selected reference value and the window glass does not arrive in the full-closed position; and
   cutting the current supply to the motor when said present rotational frequency of the motor is not larger than the selected reference value and the window glass arrives in the full-closed position.

3. A method for controlling a power window apparatus as set forth in claim 2, wherein the control further comprising the steps of:

comparing present rotational frequency of the motor with the selected reference value according to an ON-operation of a open-switch of the power window apparatus;

supplying the electric current to the motor in the opening direction of the window when said present rotational frequency of the motor is larger than the selected reference value; and cutting the current supply to the motor when said present rotational frequency of the motor is not larger than the selected reference value.

* * * * *